United States Patent
Lee et al.

(10) Patent No.: US 9,665,159 B2
(45) Date of Patent: May 30, 2017

(54) METHOD AND APPARATUS FOR SAVING POWER OF PORTABLE ELECTRONIC DEVICE

(71) Applicant: Samsung Electronics Co., Ltd., Suwon-si, Gyeonggi-do (KR)

(72) Inventors: Jonglin Lee, Suwon-si (KR); Byungwook Kim, Suwon-si (KR); Sunggeun Park, Seongnam-si (KR); Jubeam Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 14/644,493

(22) Filed: Mar. 11, 2015

(65) Prior Publication Data
US 2015/0261284 A1    Sep. 17, 2015

(30) Foreign Application Priority Data
Mar. 12, 2014    (KR) .................. 10-2014-0028938

(51) Int. Cl.
*G06F 1/26* (2006.01)
*G06F 1/32* (2006.01)

(52) U.S. Cl.
CPC ............ *G06F 1/3234* (2013.01); *G06F 1/324* (2013.01); *G06F 1/3212* (2013.01); *Y02B 60/50* (2013.01)

(58) Field of Classification Search
CPC ....... G06F 1/3234; G06F 1/3212; G06F 1/324
USPC .................................................. 713/300, 320
See application file for complete search history.

(56) References Cited

U.S. PATENT DOCUMENTS

| | | | | |
|---|---|---|---|---|
| 6,751,739 B1 * | 6/2004 | Verdun | ................. | H04W 88/14 711/105 |
| 8,397,087 B1 * | 3/2013 | Gardner | .................. | G06F 1/329 713/300 |
| 9,118,520 B1 * | 8/2015 | Mao | ........................ | G06Q 10/04 |
| 2006/0050670 A1 * | 3/2006 | Hillyard | ............ | H04W 52/0251 370/338 |
| 2006/0136764 A1 * | 6/2006 | Munguia | ............... | G06F 1/3203 713/322 |
| 2007/0094519 A1 * | 4/2007 | Yamamoto | ............ | G06F 1/3203 713/300 |
| 2007/0220293 A1 * | 9/2007 | Takase | .................. | G06F 1/3203 713/320 |
| 2009/0326725 A1 * | 12/2009 | Carlson | ................. | G06F 1/3203 700/291 |
| 2012/0238331 A1 | 9/2012 | Dou et al. | | |
| 2012/0270606 A1 | 10/2012 | Kim et al. | | |
| 2014/0222757 A1 * | 8/2014 | Huang | .............. | G06F 17/30578 707/613 |

FOREIGN PATENT DOCUMENTS

| | | |
|---|---|---|
| KR | 10-2005-0106599 A | 11/2005 |
| KR | 10-2009-0075417 A | 7/2009 |
| KR | 10-2012-0119328 A | 10/2012 |

\* cited by examiner

*Primary Examiner* — Mark Connolly
(74) *Attorney, Agent, or Firm* — Jefferson IP Law, LLP

(57) ABSTRACT

A method of saving the power of a portable electronic device is provided. The method includes starting a power saving mode, identifying an application executed in a foreground, and changing operation settings of the portable electronic device for the identified application.

18 Claims, 4 Drawing Sheets

METHOD AND APPARATUS FOR SAVING POWER OF PORTABLE ELECTRONIC DEVICE

CROSS-REFERENCE TO RELATED APPLICATION(S)

This application claims the benefit under 35 U.S.C. §119(a) of a Korean patent application filed on Mar. 12, 2014 in the Korean Intellectual Property Office and assigned Serial number 10-2014-0028938, the entire disclosure of which is hereby incorporated by reference.

TECHNICAL FIELD

The present disclosure relates to a method and an apparatus for saving the power of a portable electronic device.

BACKGROUND

In recent years, portable electronic devices have been widely used based on mobility. In particular, among them, mobile communication terminals for voice communication between two parties are very popular, so much so that almost all people use them. Meanwhile, a mobile communication terminal may have various other functions as well. For example, a mobile communication terminal may support an MP3 audio player function, and may support an image collection function by which images can be collected. The portable electronic device supports a mobile game or an arcade game.

In this way, a battery usage level rapidly increases to support various functions of the portable electronic device, and accordingly, battery usage time tends to decrease. In addition, an integration of components into the portable electronic device is increasing such that the portable electronic device supports various functions while maintaining a slim size. The increase in integration decreases space for the emission of heat, and the portable electronic device is vulnerable to damage due to the emission of heat. Accordingly, the portable electronic device requires a suitable measure for decreasing battery usage level and improving heat emission.

The above information is presented as background information only to assist with an understanding of the present disclosure. No determination has been made, and no assertion is made, as to whether any of the above might be applicable as prior art with regard to the present disclosure.

SUMMARY

In order to address the problems, according to the related art, menus for four power saving schemes such as Central Processing Unit (CPU) power saving, screen power saving, adjustment of a background of a screen, and a turning on/off of a haptic reaction of the portable electronic device are set to control a power saving operation.

Meanwhile, the power saving operation according to the related art is collectively applied to all applications executed in the portable electronic device in the same way. Accordingly, when the user executes applications to which a set power saving menu is not desired to be applied, power saving settings should be turned off. In addition, even if a power saving operation is controlled through the four menus, the effect of improving the usage time of a battery is insufficient.

Aspects of the present disclosure are to address at least the above-mentioned problems and/or disadvantages and to provide at least the advantages described below. Accordingly, an aspect of the present disclosure is to provide a method and an apparatus for saving the power of a portable electronic device in which various power saving operations can be executed for each executed application.

In accordance with an aspect of the present disclosure, a method of saving the power of a portable electronic device is provided. The method includes starting a power saving mode, identifying an application being executed in a foreground, and changing operation settings of the portable electronic device for the identified application.

In accordance with another aspect of the present disclosure, a portable electronic device is provided. The portable electronic device includes a controller configured to start a power saving mode, to identify an application being executed in a foreground, and to change operation setting of the identified application.

As discussed above, the method and apparatus for saving the power of a portable electronic device according to various embodiments of the present disclosure can set a plurality of power saving levels according to an application and change operation settings to a preset power saving level if a power saving mode is started, thereby improving the emission of heat and decreasing battery usage level.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Prior to a description of various embodiments of the present disclosure, it is noted that a power saving mode refers to a setting for improving heat emission of a portable electronic device and reducing a battery usage level according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary.

Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
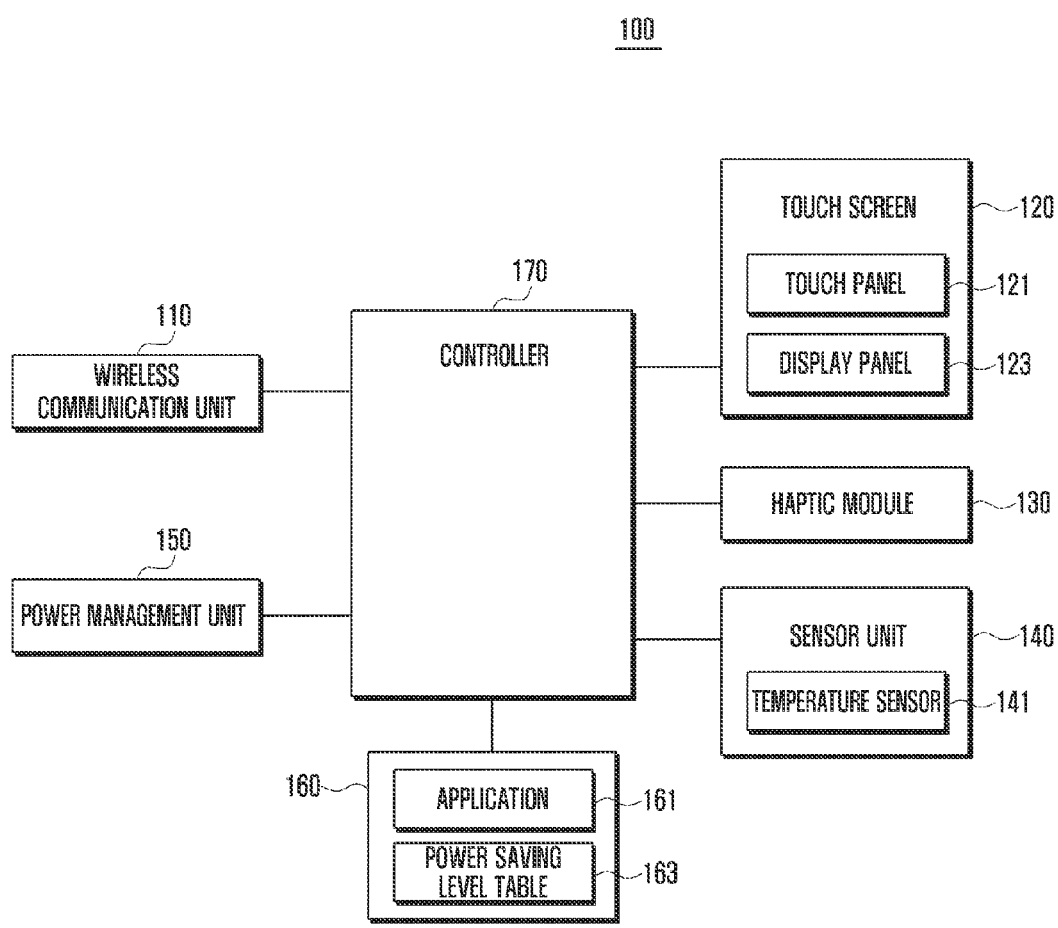
FIG. 1 is a block diagram illustrating a configuration of a portable electronic device according to an embodiment of the present disclosure.

FIG. 1 is a block diagram illustrating a configuration of a portable electronic device according to an embodiment of the present disclosure.

Referring to FIG. 1, a portable electronic device 100 according to an embodiment of the present disclosure may include a wireless communication unit 110, a touch screen 120, a haptic module 130, a sensor unit 140, a power management unit 150, a storage unit 160, and a controller 170.

The wireless communication unit 110 may form a communication channel of a preset scheme with a network (mobile communication network) which can transmit/receive a signal related to wireless communication, such as voice communication or video communication, and message service-based data communication such as a Short Message Service (SMS), a Multimedia Messaging Service (MMS), or Internet. The wireless communication unit 110 may include a transceiver for up-converting and amplifying the frequency of a transmitted signal, and low-noise amplifying and down-converting a frequency of a received signal. The wireless communication unit 110 may form a data communication channel for a message service to transmit/receive message service-based data under the control of the controller 170. Here, the communication channel may include a mobile communication channel such as Code Division Multiple Access (CDMA), Time Division Multiple Access (TDMA), and Orthogonal Frequency-Division Multiple Access (OFDMA), and an Internet communication channel such as a wired Internet network and a wireless Internet network.

The touch screen 120 may provide various screens used for operation of the portable electronic device 100. For example, the touch screen may support a standby screen and a menu screen used for management of the portable electronic device 100. The touch screen may include a touch panel 121 and a display panel 123. The touch panel 121 may be implemented by being fixed to the display panel 123 or integrated into the display panel 123.

The touch panel 121 may generate a touch event in response to a user's touch gesture for the screen, may perform an Analog-to-Digital (AD) conversion on the touch event, and may transmit the touch event to the controller 170. The touch panel 121 may be a complex touch panel including a hand touch panel for detecting a hand gesture and a pen touch panel for detecting a pen gesture. Here, the hand touch panel may be implemented by a capacitive type. Of course, the hand touch panel may be implemented by a resistive type, an infrared type, or a surface acoustic wave type.

The display panel 123 may display data on the screen under the control of the controller 170. If the controller 170 processes (for example, decodes) data and stores the processed data in a buffer, the display panel 123 may convert the buffered data into an analog signal and display the analog signal.

In the embodiment of the present disclosure, when the portable electronic device 100 starts a power saving mode, the display panel 123 may display a screen in which settings of an operation, such as a display refresh rate, a brightness, or a resolution, of an executed application, in particular, an application executed in a foreground can be changed. In more detail, if the portable electronic device 100 starts a power saving mode, the display panel 123 may display a screen in which display data transmission rate, brightness, and resolution have been changed according to a preset power saving level in response to an application executed under the control of the controller 170. Here, a power saving level indicates an operation state (for example, operation frequencies of the Central Processing Unit (CPU) and the Graphic Processing Unit (GPU), display data transmission rate, brightness, and resolution) for at least one application, and a plurality of power saving levels may be set for at least one application. For example, four power saving levels may be classified into levels such as LOW, MIDDLE, HIGH, and AUTO. The power saving levels may be variously set according to settings of the user or intentions of a designer.

In the embodiment of the present disclosure, the display panel 123 may output a screen for selecting a power saving level according to an application. In more detail, the display panel 123 may display a list of applications stored in the portable electronic device 100 and may display a screen for setting power saving levels for the entirety or some of the displayed applications.

The display panel 123 may be implemented by a Liquid Crystal Display (LCD), an Active Matrix Organic Light Emitted Diode (AMOLED), a Passive Matrix Organic Light Emitted Diode (PMOLED), a flexible display, or a transparent display.

The haptic module 130 may convert an electrical signal into mechanical vibrations. That is, the haptic module 130 may support vibrations through a vibration motor according to execution of an application. In the embodiment of the present disclosure, the haptic module 130 may be switched on or off for reduction of battery usage level according to a power saving level. Meanwhile, the present disclosure is not limited thereto, and the haptic module 130 may be set such that an intensity of a haptic reaction is different according to power saving levels.

The sensor unit 140 may measure a physical property or detect an operational state of the portable electronic device 100, and may convert the measured or detected information into an electrical signal. The sensor unit 140 may include at least one of, for example, a gesture sensor, a gyro sensor, an atmosphere sensor, a magnetic sensor, an acceleration sensor, a grip sensor, a proximity sensor, a color sensor (For example, a Red, Green, and Blue (RGB) sensor), a living body sensor, a temperature sensor 141, a humidity sensor, an illumination intensity sensor, and a ultraviolet (UV) sensor. Additionally or alternatively, the sensor module 140 may include, for example, an E-nose sensor (not illustrated), an ElectroMyoGraphy (EMG) sensor (not illustrated), an ElectroenCephaloGram (EEG) sensor (not illustrated), an ElectroCardioGram (ECG) sensor (not illustrated), an InfraRed (IR) sensor, an iris sensor (not illustrated), and a fingerprint sensor. The sensor unit 140 may further include a control circuit for controlling at least one sensor in the sensor unit 140.

In the embodiment of the present disclosure, the temperature sensor 141 may detect a temperature of the portable electronic device 100 at a predetermined time. In more detail, the temperature sensor 141 may include at least one of a temperature sensor 141 disposed at a predetermined point of a Printed Circuit Board (PCB) disposed in the portable electronic device 100, a temperature sensor 141 disposed in the interior of or at a location adjacent to the controller 170, and a temperature sensor 141 disposed adjacent to various control units for supporting a specific user function of the portable electronic device 100 or disposed in the interiors of the control units. The temperature sensor 141 may transmit collected temperature information to the controller 170. The temperature sensor 141 disposed in the interior of the controller 170 is disposed at a location near an Application Processor (AP) core chip and detects temperature due to emission of heat by consuming currents according to driving of an AP. Here, when the controller 170 additionally employs a multi-chip, for example, a communication module chip for supporting a communication function, the temperature sensor 141 may have a temperature sensor 141 in an adjacent area of the corresponding communication module chip to detect temperature information. Alternatively, the temperature sensor 141 may have a temperature sensor 141 in a common area of the AP chip and the communication module chip to detect temperature information. In addition, the above-described temperature sensor 141 may be disposed in control units for supporting a user function, for example, an image signal processor or a graphic support unit. As described above, the temperature sensor 141 according to the present disclosure may have at least one temperature sensor 141 to provide a differential voltage for a temperature to at least one of various systems of the portable electronic device 100 according to a design scheme, and may detect temperature information based on the function.

The power management unit 150 may manage power of the portable electronic device 100. Although not illustrated, the power management module 150 may include, for example, a Power Management Integrated Circuit (PMIC), a charger Integrated Circuit (IC), or a battery or fuel gauge.

The PMIC may be mounted in, for example, an integrated circuit or a System on Chip (SoC) semiconductor. Charging methods may be classified into a wired charging method and a wireless charging method. The charger IC may charge a battery and prevent over voltage or over current from flowing from a charger. According to an embodiment, the charger IC may include a charger IC for at least one of the wired charging method and the wireless charging method. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added. The battery gauge may measure, for example, the remaining level of a battery, a voltage, a current, and a temperature of the battery during the changing thereof. The battery may store or generate electricity and electric power may be supplied to the portable electronic device using the stored and generated electricity. The battery may include, for example, a rechargeable battery and a solar battery.

The storage unit 160 may include any suitable storage device such as, for example, a disk, a Random Access Memory (RAM), and a flash memory. The storage unit 160 may store data generated by the portable electronic device 100 or data received from an external device, for example, a server or a desktop computer through a communication unit or an external interface (not illustrated), including an operating system (OS) for operating the portable electronic device 100.

In the embodiment of the present disclosure, the storage unit 160 may store various applications 161 and a power saving level table 163. According to various embodiments, the application 161 may include an SMS/MMS application, an email application, a calendar application, an alarm application, a health care application (e.g., an application for measuring a quantity of exercise, blood sugar, etc.), and an environmental information application (e.g., an application for providing information on atmospheric pressure, humidity, temperature, etc.). The application 161 may be related to the exchange of information between the portable electronic device 100 and an external electronic device. The application related to the exchange of information may include, for example, a notification relay application for notifying the external electronic device of specific information, and a device management application for managing the external electronic device.

For example, the notification relay application may include a function of notifying the external device (for example, the electronic device 104) of notification information generated in another application (for example, an SMS/MMS application, an e-mail application, a health management application, or an environment information application) of the portable electronic device 100. Additionally or alternatively, the notification relay application may receive notification information, for example, from an external electronic device to provide the notification information for the user. The device management application may manage (for example, install, delete, or update), for example, a function (for example, turning on or off of the external electronic device (or some components thereof) or adjustment of the brightness (or resolution) of a display) for at least a part of an external electronic device, an application operated in the external electronic device, or a service (for example, a voice communication service or a message service) provided by the external electronic device.

According to various embodiments of the present disclosure, the device management application may include an application designated according to an attribute (for example, the type of the electronic device) of the external electronic device. For example, when the external electronic device is an MP3 player, the application may include an application related to playback of music. Similarly, when the external device is a mobile medical instrument, the application may include an application related to management of health. According to the embodiment of the present disclosure, the application may include at least one of an application designated to the portable electronic device 100 and an application received from an external electronic device.

The power saving level table 163 is a table in which a plurality of power saving levels are set for each application stored in the storage unit 160. That is, the power saving level table 163 may be a table in which power saving levels for changing an operation of an application that is executed in a foreground when a power saving mode is started are set. For example, when the portable electronic device 100 starts a power saving mode, the power saving level may limit the maximum operation frequencies of the CPU and the GPU of the application that is executed in the foreground and may optimally set display data transmission rate, brightness, resolution, and the like. Table 1 represents an example of a power saving level table 163 for a first application stored in the storage unit 160.

TABLE 1

| Classification | Items | Power saving levels | | | |
|---|---|---|---|---|---|
| | | LOW | MIDDLE | HIGH | AUTO |
| First application | CPU | 1.8 GHz | 1.5 GHz | 1.2 GHz | 1.8 GHz |
| | GPU | 266 MHz | 177 MHz | 177 MHz | 266 MHz |
| | FPS | 60 fps | 40 fps | 30 fps | 30 fps |
| | BRIGHTNESS | −20 cd/m² | −40 cd/m² | −60 cd/m² | 0 cd/m² |
| | HAPTIC | ○ | X | ○ | X |

In Table 1, the CPU row denotes a maximum operation frequency of a CPU operated in a power saving mode, the GPU row denotes a maximum operation frequency of a GPU, FPS denotes a display refresh rate in units of Frames Per Second (FPS), BRIGHTNESS denotes brightness in units of candela (cd) per square meter, and HAPTIC denotes a haptic reaction. For example, when a power saving mode is started, the controller 170 inquires the power saving level table 163 if it is identified that the first application is executed in the foreground, and if it is identified that a power saving level of the first application is set to a LOW level, the controller 170 may change a current operational state of the portable electronic device 100, in particular, an operation of the first application such that a maximum operation frequency of the CPU is 1.8 GHz, an operation frequency of the GPU is 266 MHz, a display refresh rate is 60 FPS, a brightness is 20 cd/m², and a haptic reaction is maintained.

In Table 1, the power saving level table 163 may be set such that a battery usage level decreases as the power saving level goes from a LOW level toward a MIDDLE level and a HIGH level, and an AUTO level may refer to a level set such that a change in an operation of the CPU, the GPU, the FPS, the BRIGHTNESS, and the HAPTIC item is optimized.

Meanwhile, Table 1 is an example, and the technical spirit of the present disclosure is not limited thereto. That is, although it is exemplified that a power saving level table 163 in which the power saving levels are classified into four power saving levels, that is, LOW, MIDDLE, HIGH, and AUTO levels, the power saving level table 163 may set different power saving levels for all applications stored in the storage unit 160. For example, presuming four applications are stored in the storage unit 160, the first application may be set such that a maximum driving frequency of the CPU is 1.8 GHz, a maximum driving frequency of the GPU is 266 MHz when being set to a HIGH level, whereas the second application may be set such that a maximum driving frequency of the CPU is 1.5 GHz and a maximum driving frequency of the GPU is 450 MHz when being set to a HIGH level. The LOW level of the third application may be set such that a maximum driving frequency of the CPU is 1.8 GHz and a maximum driving frequency of the GPU is 200 MHz, and the AUTO level of the fourth application may be set such that a maximum driving frequency of the CPU is 1.2 GHz and a maximum driving frequency of the GPU is 200 MHz. The number of the power saving levels may be four, but also may be more than or less than four. For example, in Table 1, EXTRA LOW and EXTRA HIGH levels may be set in addition to LOW, MIDDLE, HIGH, and AUTO levels.

In Table 1, although maximum driving frequencies of the CPU and the GPU, FPS, BRIGHTNESS, and HAPTIC are exemplified, the present disclosure is not limited thereto. That is, the power saving level table 163 may set power saving levels for a resolution and a background color of a screen, in addition to the four items. The power saving level table 163 may set activation of various sensors in the sensor unit 140, for example, an acceleration sensor, a gyro sensor, and a geo-magnetic sensor.

The maximum driving frequencies of the CPU and the GPU, FPS, BRIGHTNESS, and HAPTIC of the power saving control table are set to a level which does not cause inconvenience and may be determined at a suitable level using a trial-and-error method. For example, FPS and BRIGHTNESS may be set such that they do not cause an offensive feeling to the eyes of the user even when display refresh rate and brightness are reduced.

The controller 170 may control an overall operation of the portable electronic device 100 and a signal flow between internal components of the portable electronic device 100 and may perform a function of processing data. The controller 170 may include at least one for calculating and comparing materials, and analyzing and executing instructions, and may include various registers for temporarily storing data and instructions. The controller 170 includes at least one GPU. In place of the CPU, the GPU is a graphic control unit which performs calculations and comparisons of graphic-related data, and the interpretation and execution of instructions, and the like. Each of the CPU and the GPU may be integrated into one package in which two or more independent cores (for example, quad-core) form a single integrated circuit. That is, the CPUs may be integrated into one multi-core processor. The GPUs also may be integrated into one multi-core processor. The CPU and the GPU may be a SoC. Further, the CPU and the GPU may be packaged as a multi-layer. Meanwhile, a configuration including the CPU and the GPU may be referred to as an "AP."

In the embodiment of the present disclosure, the controller 170 may start a power saving mode. That is, if it is identified that a temperature of the portable electronic device 100 is a predetermined temperature or higher, or a battery usage level of the portable electronic device 100 is a predetermined value or more, the controller 170 may start a power saving mode.

In more detail, the controller 170 may receive temperature information from at least temperature sensor 141 disposed in the portable electronic device 100, for example, at a predetermined point of a PCB, in the controller 170, at a location adjacent to the controller, and in various control units disposed for supporting a specific user function of the portable electronic device 100. The controller 170 may compare the received temperature and a preset specific temperature. Here, the preset specific temperature is a temperature set for improving the emission of heat, and may be set according to an intention of the user or the designer. For example, the user may set the specific temperature to 40° C., and the controller 170 may identify that a power saving mode is started if the received temperature is equal to or higher than 40° C.

The controller 170 may receive battery usage level information from the power management unit 150, and may start a power saving mode if the received battery usage level is a predetermined level or higher. That is, the controller 170 may receive battery usage information (for example, remaining battery level information, output voltage information, and output current information of a battery). The controller 170 may make a compare a current battery usage level with a preset specific battery usage level, and start a power saving mode if it is identified that the current battery usage level is a preset specific level or higher. Here, the preset specific battery level may be set according to an intention of the user or the designer. For example, the specific level may be set to 50% of the entire battery usage level. The controller 170 may set a plurality of specific battery usage levels, and in this case, the controller 170 may control a touch screen such that the user provides a screen for selecting the specific battery usage levels.

The controller 170 may identify at least one application that is being executed in the foreground. That is, the controller 170 may identify which application is executed in the foreground of the current touch screen and the battery usage share of the executed application.

In more detail, the controller 170 may identify an application executed in the foreground among the currently executed applications, and may identify a battery usage level consumed by the application executed for a predetermine time period. To achieve this, the controller 170 may receive a resource allocated to or task information processed by an application executed while the executed application is operated from a system, for example, the CPU and the GPU, and may identify the battery usage share of the executed application.

The controller 170 may identify a power saving level of the application executed in the foreground, and may make a control to change the settings of an operation of the application according to the identified power saving level. In more detail, the controller 170 may identify an application being executed in the foreground and a battery usage share of the application. The controller 170 may identify a power saving level, which is set in the power saving level table 163, for an application having a high battery usage share among the applications executed in the foreground. For example, when an Internet browser application is executed in the foreground and the battery usage share of the Internet browser application is highest, a power saving level set to the Internet browser application may be identified from the power saving level table 163. When two or more applications are executed in the foreground, the battery usage shares of the executed applications are similar, and the sum of the battery usage shares of the executed applications is a specific value or more, power saving levels of the executed applications may be identified. For example, when a battery usage share of the first application is 35%, a battery usage share of the second application is 33%, and the specific share is set to 50%, the power saving levels of the first application and the second application may be identified. The controller 170 may change the setting of an operation of the application to an identified power saving level.

In addition, the above-described portable electronic device 100 may further include an input unit including various keys for generation of input signals and an audio processor for processing audio signals.

Figure 2:
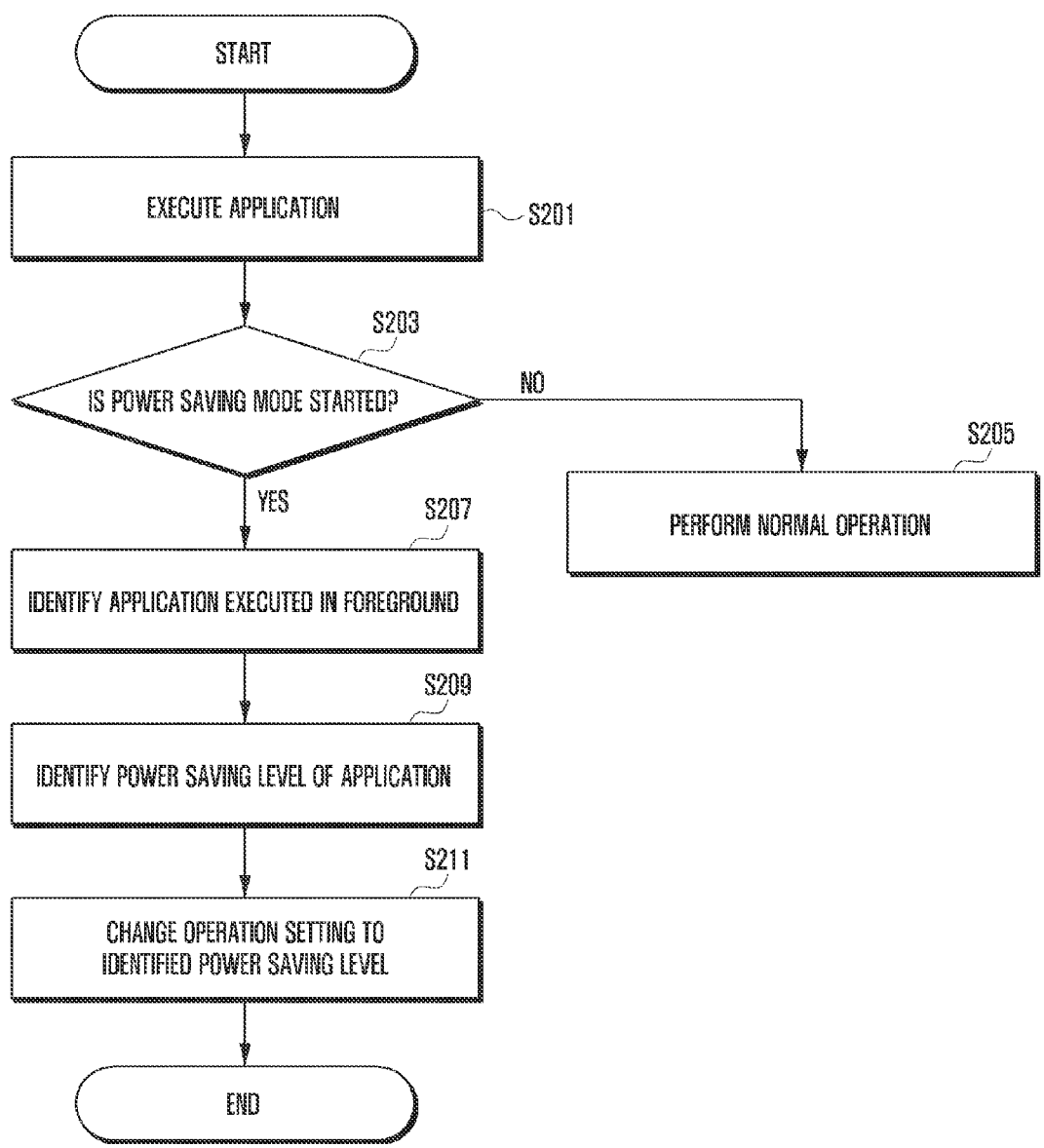
FIG. 2 is a flowchart explaining a method of saving the power of a portable electronic device according to an embodiment of the present disclosure.

FIG. 2 is a flowchart explaining a method of saving the power of a portable electronic device 100 according to an embodiment of the present disclosure.

Referring to FIG. 2, in operation S201, the controller 170 may receive an event by an input of the user, and may execute at least one application. For example, the controller 170 may execute various applications stored in the storage unit 160, and may execute at least one application in various forms such as one page, a pop-up window form, a multi-window form, and a Picture In Picture (PIP) form.

In operation S203, the controller 170 may identify whether the portable electronic device 100 satisfies a condition for starting a power saving mode. That is, if it is identified that a temperature of the portable electronic device 100 is a predetermined temperature or higher, or a battery usage level of the portable electronic device 100 is a predetermined value or more, the controller 170 may start the power saving mode.

In more detail, the controller 170 may receive temperature information from at least one temperature sensor 141 disposed in the interior of the portable electronic device 100, for example, at a predetermined point of a PCB, in the interior of a control unit constituting the controller 170, at a location adjacent to the control unit, and in various control units disposed for supporting a specific user function. The controller 170 may compare the received temperature and a preset temperature. Here, the preset specific temperature is a temperature set for improving the emission of heat, and may be set according to an intention of the user or the designer. The controller 170 may receive battery usage level information from the power management unit 150, and may start a power saving mode if the received battery usage level is a predetermined level or higher. That is, the controller 170 may receive battery usage information (for example, remaining battery level information, output voltage information, and output current information of a battery). The controller 170 may compare a current battery usage level with a preset specific battery usage level and start a power saving mode if the current battery usage level is a predetermined level or higher. Here, the preset specific battery level may be variously set according to an intention of the user or the designer. For example, the specific level may be set to 50% of the entire battery usage level. The controller 170 may set a plurality of specific battery usage levels, and in this case, the controller 170 may control a touch screen such that the user provides a screen for selecting the specific battery usage levels.

In operation S203, if it is determined that a condition for starting a power saving mode is not satisfied, the controller 170 may execute a normal operation, that is, an operation to which a power saving mode is not applied in operation S205. That is, the controller 170 may make a control to maintain the current settings for an operation of the system and a display operation.

In operation S207, the controller 170 may identify an application executed in the foreground. That is, the controller 170 may identify which application is executed in the foreground of the current touch screen and the battery usage share of that application.

In more detail, the controller 170 may identify an application executed in the foreground among the currently executed applications and may identify a battery usage level consumed by the application executed during a predetermined time period. To achieve this, the controller 170 may receive a resource allocated to the application or task information processed by the application executed associated with, for example, the CPU and the GPU, and may identify a battery usage share of the executed application.

In operation S209, the controller 170 may identify a power saving level of the application identified in operation S207. For example, when an Internet browser application is executed in the foreground and a battery usage share of the Internet browser application is highest, a power saving level for the Internet browser application may be identified from the power saving level table 163. When two or more applications are executed in the foreground, the battery usage shares of the executed applications are similar, and the sum of the battery usage shares of the executed applications is a specific value or more, power saving levels of the executed applications may be identified. For example, when a battery usage share of the first application is 35%, a battery usage share of the second application is 33%, and the specific share is set to 50%, the power saving levels of the first application and the second application may be identified.

In operation S211, the controller 170 may change settings of the operation of the portable electronic device 100 to an application power saving level identified in operation S209. For example, when a power saving level is set to a MIDDLE level for the first application, the controller 170 may change settings of an operation of the first application according to the MIDDLE level. For example, when a power saving level is set to a HIGH level for the second application, the controller 170 may make a control to change settings of an operation of the second application according to the HIGH level.

Figure 3:
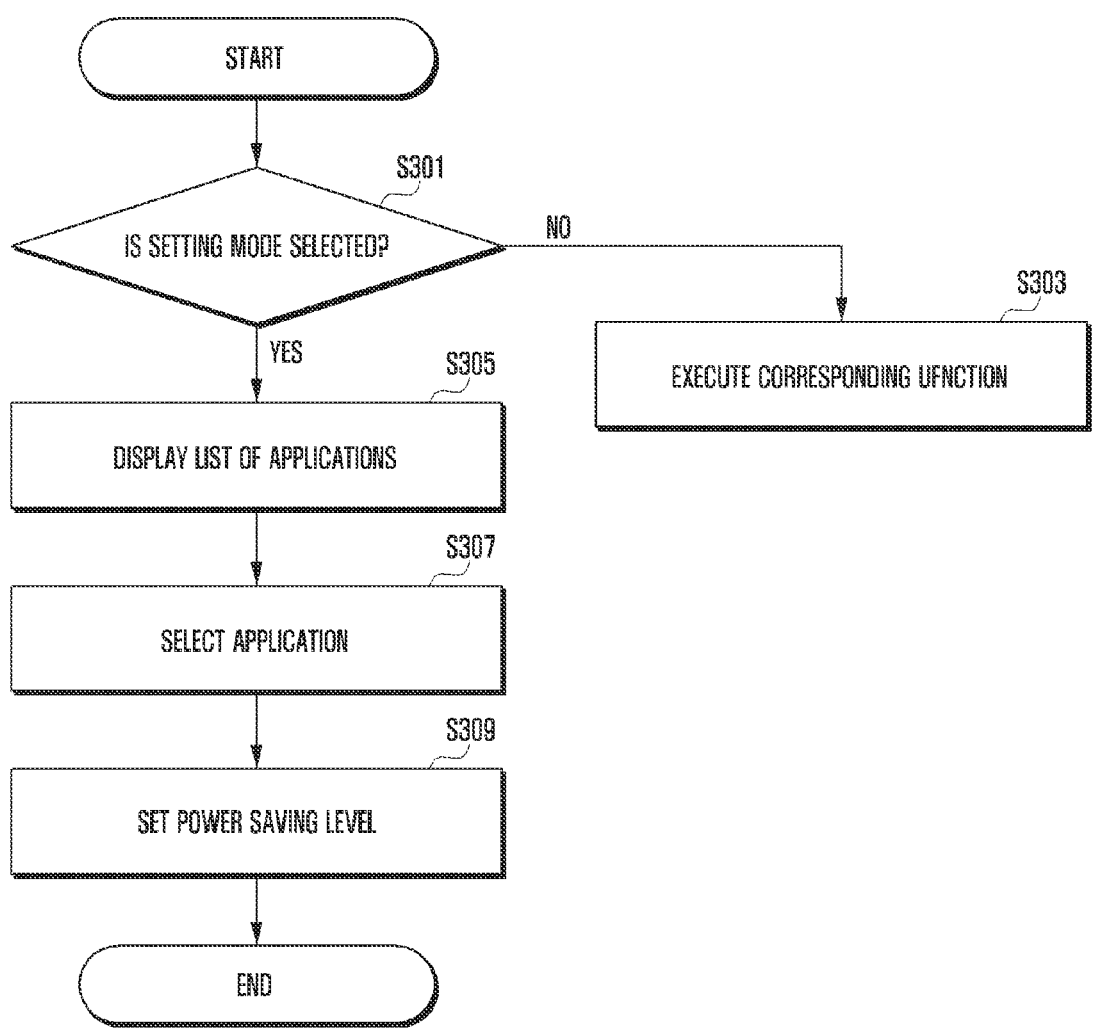
FIG. 3 is a flowchart explaining a method of selecting a power saving mode of a portable electronic device according to an embodiment of the present disclosure.

FIG. 3 is a flowchart explaining a method of selecting a power saving mode of a portable electronic device according to an embodiment of the present disclosure.

Referring to FIG. 3, in operation S301, the controller 170 may identify whether an event for setting a power saving mode is received. That is, the controller 170 may identify whether a power saving mode, that is, an event for setting a plurality of power saving levels for each of the applications, is selected by the user.

In operation S301, if it is identified that an event for setting a power saving mode is not received, the controller 170 may execute a function corresponding to an event in operation S303.

Meanwhile, if it is identified that an event for setting a power saving mode is received in operation S301, the controller 170 may display a list of the applications stored in the storage unit 160.

In operation S307, the controller 170 may select at least one application for setting a power saving level. Here, to set a power saving level, the user may select all of the applications stored in the storage unit 160, select a predetermined number of applications, or individually select each of the applications.

In operation S307, if all or some of the applications stored in the storage unit 160 are selected, the controller 170 may output a screen for setting a power saving level for the selected application. If the user selects a power saving level, for example, any one of LOW, MIDDLE, HIGH, and AUTO levels, the controller 170 may make a control to change settings according to the selected levels.

Figure 4:
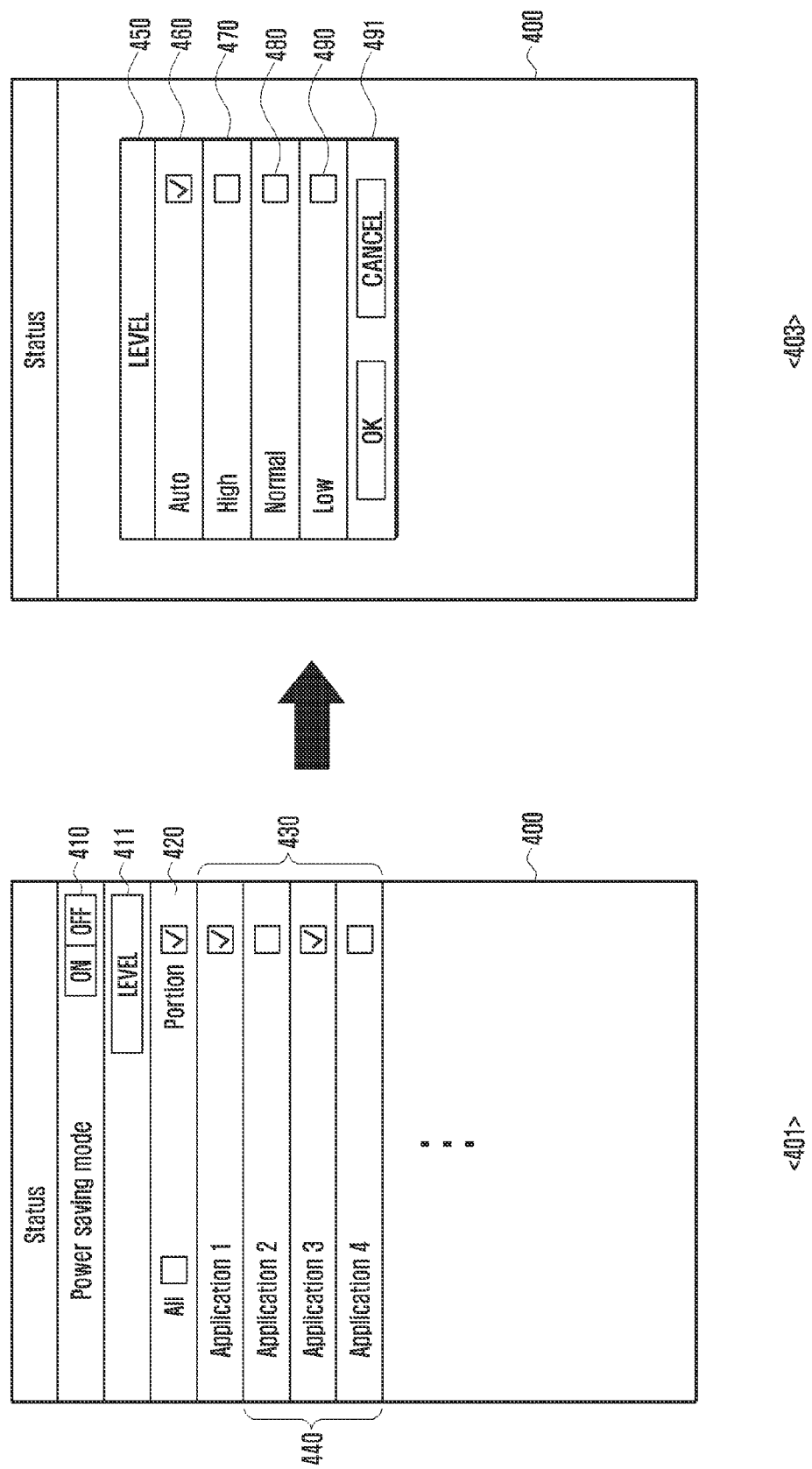
FIG. 4 is a view explaining a method of selecting a power saving mode of a portable electronic device according to an embodiment of the present disclosure.

FIG. 4 is a view explaining a method of selecting a power saving mode of a portable electronic device according to an embodiment of the present disclosure.

Referring to FIG. 4, reference numeral 401 denotes a power saving mode setting screen 400 provided for the user. The power saving mode setting screen 400 includes an area 410 for turning on or off the power saving mode, an area 411 for selecting a power saving level, an area 420 for selecting all or some of the applications, and an application list 440 stored in the storage unit 160.

Reference numeral 403 denotes a screen 400 for selecting a power saving level. That is, reference numeral 403 denotes a screen 400 displayed when some application selection boxes in the area 420 are selected and an area 411 for selecting a power saving level is selected. For example, in FIG. 4, the first application and the second application 430 are selected to set their respective power saving level.

A plurality of power saving level selection areas 460, 470, 480, and 490 for the selected application are displayed through a popup window 450, and a state in which a current AUTO level selection area 460 is displayed. If the user selects an identification button display in an identification/cancel area 491, the controller 170 may set a power saving level to an AUTO level for the first application and the second application.

As discussed above, the method and apparatus for saving power of a portable electronic device 100 according to various embodiments of the present disclosure can set power saving levels according to an application and change operation settings to a preset power saving level if a power saving mode is started, thereby emission of heat and decreasing battery usage level.

Meanwhile, the above-mentioned electronic device 100 may further include various and additional modules according to their type. That is, the terminal may further include configurations, such as a short distance communication module for short distance communications, an interface for transmitting and receiving data by a wired or wireless communication scheme of the portable electronic device 100, an Internet communication module for performing an Internet function through communication with an Internet network, and a digital broadcasting module for receiving and reproducing digital broadcasts, which have not been described above. These elements may be variously modified according to the convergence trend of digital devices, and cannot be all enumerated. However, the electronic device 100 may further include elements equivalent to the above-described elements. Also, in the portable terminal 100, a particular configuration may be excluded from the above-described configuration or may be replaced by another configuration according to various embodiments of the present disclosure. This may be easily understood by those skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of saving power of a portable electronic device, the method comprising:
    setting a power saving mode to set a power saving level for at least one application, the power saving level being selected from a group of power saving levels;
    starting the power saving mode;
    identifying at least one other application being executed in a foreground; and
    changing operation settings of the portable electronic device for the other application according to the power saving levels.

2. The method of claim 1, wherein the starting of the power saving mode comprises:

receiving one of temperature information and battery usage level information of the portable electronic device; and when a temperature of the portable electronic device is equal to or higher than a predetermined temperature or a usage level of a battery is equal to or higher than a predetermined usage level, starting the power saving mode.

3. The method of claim 1, wherein the operation setting comprises setting a maximum operation frequency of one of a Central Processing Unit (CPU) and a Graphic Processing Unit (GPU) according to the power saving levels.

4. The method of claim 3, further comprising selecting the power saving level from the group of power saving levels, wherein the changing of the operation setting comprises changing the maximum operation frequency of one of the CPU and the GPU according to the power saving level.

5. The method of claim 1, wherein the operation setting comprises one of a display refresh rate, a brightness, a resolution, and a haptic reaction.

6. The method of claim 5, further comprising selecting the power saving level from the group of power saving levels, wherein the changing of the operation settings comprises changing one of the display refresh rate, the brightness, the resolution, and the haptic reaction.

7. The method of claim 1, further comprising:

displaying a screen for selecting a power saving level from the group of power saving levels; and selecting the power saving level for the at least one application stored in the portable electronic device.

8. The method of claim 1, wherein the identifying of the at least one other application executed in the foreground further comprises identifying a battery usage share of the at least one other application.

9. The method of claim 8, wherein the changing of the operation settings comprises changing an operation of the at least one other application when a battery usage share is equal to or higher than a specific battery usage share.

10. A portable electronic device comprising:

a controller configured to:

set a power saving mode to set a power saving level for at least one application, the power saving level being selected from a group of power saving levels, start the power saving mode, identify at least one other application being executed in a foreground, and change an operation setting of the at least one other application according to the power saving levels.

11. The portable electronic device of claim 10, further comprising a temperature sensor configured to detect a temperature of the portable electronic device and to detect usage level of a battery, wherein, when a temperature of the portable electronic device is equal to or higher than a predetermined temperature or a usage level of a battery is equal to or higher than a predetermined usage level, the controller is further configured to start the power saving mode.

12. The portable electronic device of claim 10, wherein the controller is further configured to set a maximum operation frequency of one of a Central Processing Unit (CPU) and a Graphic Processing Unit (GPU) according to the power saving levels.

13. The portable electronic device of claim 12, wherein the controller is further configured to:

select the power saving level from the group of power saving levels, and change the maximum operation frequency of one of the CPU and the GPU according to the power saving level.

14. The portable electronic device of claim 10, wherein the operation setting comprises one of a display refresh rate, brightness, resolution, and a haptic reaction.

15. The portable electronic device of claim 14, wherein the controller is further configured to:

select the power saving level from the group of power saving levels, and change one of the display refresh rate, the brightness, the resolution, and the haptic reaction.

16. The portable electronic device of claim 10, further comprising a touch screen configured to display an image for selecting the power saving level from the power saving levels, wherein the controller is further configured to select the power saving level for the at least one application stored in the portable electronic device.

17. The portable electronic device of claim 10, wherein the controller identifies a battery usage share of the at least one other application.

18. The portable electronic device of claim 17, wherein the controller is further configured to change an operation of the at least one other application when a battery usage share is equal to or higher than a specific battery usage share.

* * * * *